United States Patent [19]

Drixler

[11] 4,343,213
[45] Aug. 10, 1982

[54] BLADE PROTECTION IN TILTABLE CIRCULAR SAW MACHINES

[75] Inventor: Karl Drixler, Nürtingen-Neckarhausen, Fed. Rep. of Germany

[73] Assignee: Chr. Eisele Machinenfabrik GmbH. & Co. KG, Fed. Rep. of Germany

[21] Appl. No.: 102,124

[22] Filed: Dec. 10, 1979

[30] Foreign Application Priority Data

Dec. 23, 1978 [DE] Fed. Rep. of Germany ....... 2856038

[51] Int. Cl.³ .......................... B27B 5/18; B23D 45/04
[52] U.S. Cl. ...................................... 83/397; 83/478; 83/490; 83/481
[58] Field of Search ................. 83/397, 478, 485, 488, 83/489, 490, 544, 481; 51/268, 269, 271; 144/251 R, 252 R

[56] References Cited

U.S. PATENT DOCUMENTS

| | | | |
|---|---|---|---|
| 1,746,594 | 2/1930 | Jacobson | 83/490 |
| 2,109,057 | 2/1938 | Billker et al. | 83/481 |
| 2,637,353 | 5/1953 | Hyslop | 83/478 |
| 2,876,810 | 3/1959 | Peterson | 144/251 R |
| 3,249,134 | 5/1966 | Vogl et al. | 83/478 |
| 3,574,315 | 4/1971 | Boultinghouse | 83/490 |
| 3,998,121 | 12/1976 | Bennett | 83/490 |
| 4,028,975 | 6/1977 | Bennett | 83/478 |

FOREIGN PATENT DOCUMENTS

| | | | |
|---|---|---|---|
| 93994 | 12/1896 | Fed. Rep. of Germany | 83/485 |
| 965169 | 2/1950 | France | 83/478 |
| 1140695 | 3/1957 | France | 83/490 |
| 2312327 | 12/1976 | France . | |
| 2330500 | 6/1977 | France . | |
| 791601 | 3/1958 | United Kingdom | 51/268 |

*Primary Examiner*—James M. Meister
*Assistant Examiner*—K. Bradford Adolphson
*Attorney, Agent, or Firm*—Olsen and Stephenson

[57] ABSTRACT

A first part 34 of the protection device 32 is mounted on the tiltable saw assembly, embraces the saw blade 24 from behind, and extends to the lower peripheral region of the blade 24. A second part 36 forms a cover which engages over the blade 24 and which, in the starting position of the saw assembly, surrounds the blade 24 at the upper peripheral portion and at the peripheral portion presented to the operating side, as far as the vicinity of the lower peripheral portion or the cutting location. A cam 74 on one part cooperates with a follower 78 on the other part so that, as the saw assembly is tilted, the covering part 36 remains at substantially the same horizontal level.

2 Claims, 7 Drawing Figures

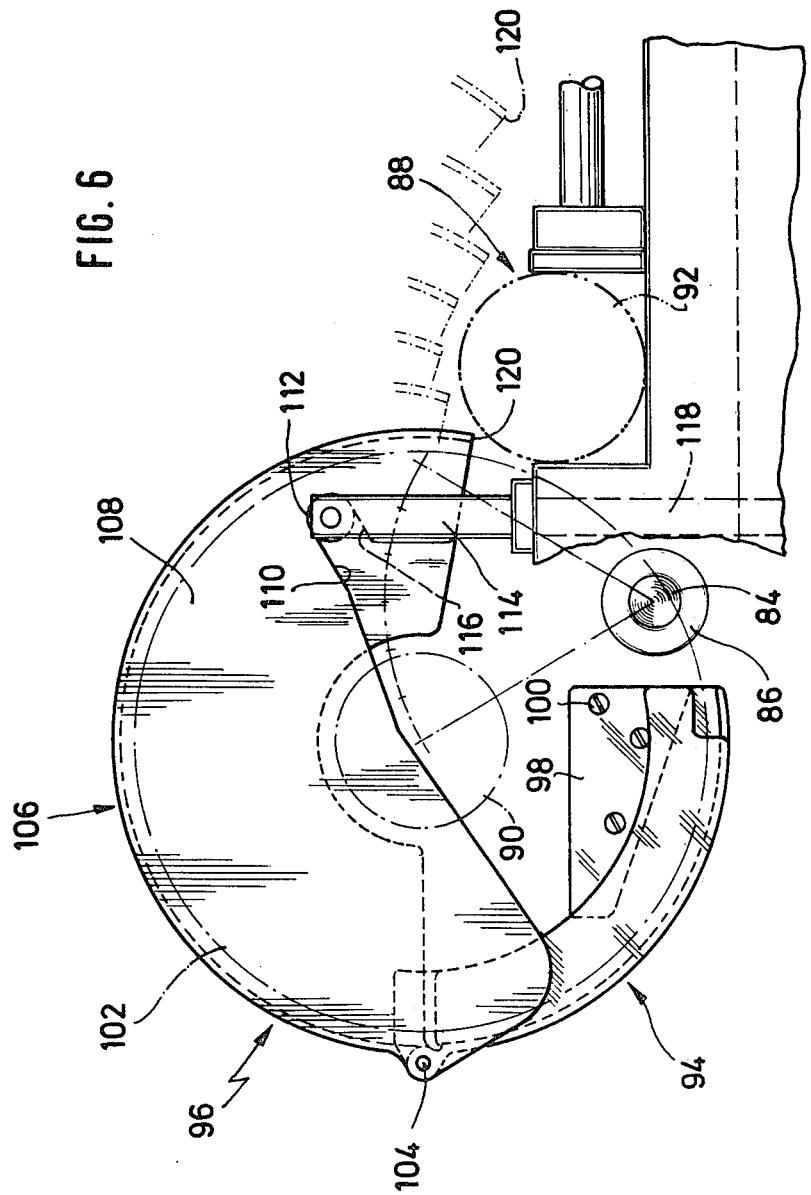

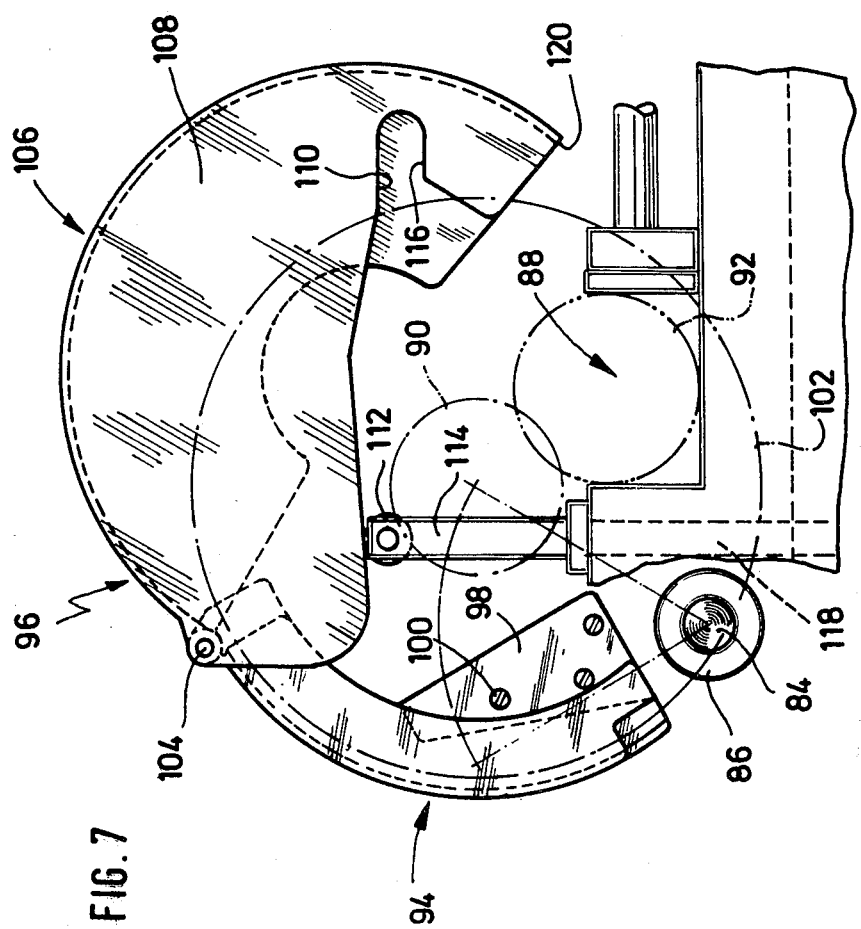

BLADE PROTECTION IN TILTABLE CIRCULAR SAW MACHINES

BACKGROUND AND SUMMARY OF THE INVENTION

The invention relates to a protection device for a circular saw blade in a circular saw machine having a tiltable saw assembly.

Protection devices for such circular saw machines are known in which one part forms a cover which can be fixed to the saw assembly, partly accommodates the circular saw blade in itself, and engages over approximately one half of the blade at both sides. The other part screens the remainder of the accessible side of the blade as well as the peripheral portion which is located at the operating end, in that it embraces the said portion. In order to provide in this case good visibility in the working region of the circular saw blade, this part of the device consists of a transparent synthetic resin material. Moreover it is adjustable relative to the height of the cover, in that it is arranged to be rotatable about an axis, in order to ensure upon tilting of the saw assembly that this member remains always in the same position relatively to the cutting location when the sawing advance is being performed.

The known protection device thereby ensures effective protection against contact with the freely accessible face of the circular saw blade and with the operating end.

However, on the other side of the saw assembly the portion of the blade which projects downwardly from the assembly is freely accessible; for this reason this kind of construction does not satisfy current standards for treatment and processing machines which prescribe inter alia that, in the rest position of the circular saw blade, access to the cutting portion must not be possible, and that, in the working position, only that portion of the saw blade is to be released which is used for cutting.

Therefore, what is desired is a protection device which satisfies these standards.

The present invention provides a protection device for a circular saw blade in a circular saw machine having a tiltable saw assembly which comprises a horizontal saw shaft and which is tiltable about a horizontal pivot axis for the purpose of performing the saw advance, the protection device comprising a first part and a second part which, in a starting position of the saw assembly, together cover the circular saw blade from above at its freely accessible side face and at least at the peripheral portion which is present at the operating side, the first part being arranged stationarily on the saw assembly and the second part being arranged to be adjustable parallel to the first part, the said first part embracing the circular saw blade at least from behind and extending substantially as far as the lower peripheral region, the said second part forming a cover which engages over the circular saw blade and which, in the starting position of the saw assembly, surrounds the circular saw blade at the upper peripheral portion and at the peripheral portion which is present at the operating side, at least as far as the vicinity of the lower peripheral portion or the cutting location, the device including control means by which the second part is adjustable relative to the first part, during tilting of the saw assembly, in such a manner that, in each phase of the tilting movement of the saw assembly, the second part retains substantially the same position in space relative to a horizontal plane.

In a protection device constructed in this manner the circular saw blade is covered at least in the peripheral region and laterally to such extent that in the starting position of the saw assembly unintentional entry into the cutting portion is no longer possible.

In this case the control means associated with the cover ensures that in each phase of the saw advance and in spite of the pivotal movement of the saw assembly the cover substantially maintains its position in the vertical plane. It is attained thereby that nevertheless the cover may be displaced relatively to the cutting location in the direction in which the saw slot extends, owing to the pivotal movement of the saw assembly, that in this case, however, during sawing, neither a collision with the work clamping device or the workpiece, nor a displacement is possible such that the circular saw blade becomes accessible from one or both end faces in the peripheral region, from the operating end or from the end located opposite thereto.

A further advantage is that at least in the rest position the movable part of the protection device is retained in such a manner that it is protected against unintentional lifting and the saw blade is released only during movement of the saw assembly to the working position.

It is advantageous in this case for the cover to be locked by the control means, in the starting position of the saw assembly, so that additional auxiliary means may be omitted.

The displaceable part of the protection device formed by the cover may be vertically adjustable relatively to the saw assembly or rotatable about a pivot axis. In either case it is advantageous to construct the control means in such a manner that the cam-following member provided in accordance with this claim and co-operating with a control cam may be used, also for locking the cover, in the starting position of the saw assembly, the cam-following member engaging in an appropriate recess in the control cam.

A further improvement provides that the cover is retainable in its release position and returns automatically to its covering position upon displacement of the saw assembly. This unlocking of the cover may be performed in a simple manner in that it is retainable in its release position by means of an abutment member which is arranged to be displaceable from an abutment position to a release position, preferably on a manual lever of the saw assembly; this abutment member then necessarily releases the cover upon displacement of the saw assembly.

In as much as a tiltable circular saw machine is involved the saw assembly of which is pivotal on the machine frame in such a manner that, during its movement between the two pivotal end positions theref, the circular saw blade is guided substantially from behind to a workpiece clamping device, a favourable construction is obtained. If, in contrast, the pivotal assembly is displaceable along a circular arc portion extending from the top to the bottom during its pivotal movement in the direction of the workpiece, an advantageous construction of the protection device is attainable. In this case the circular saw blade is substantially completely covered at its freely accessible face in the rotation starting position of the saw assembly, and the cover may be so constructed that the circular saw blade is completely embraced by the cover at its face adjacent the saw assembly, at least in the peripheral region as far as its lower peripheral portion, so that then in co-operation with the part of the protection device secured to the saw assembly the circular saw blade is accommodated completely encapsulated in the protection device.

A further advantageous variant of this kind of construction resides in that the part of the protection device which is secured to the saw assembly is so constructed that it engages over the circular saw blade likewise at the upper peripheral portion thereof. Thereby a particularly safe arrangement is made which provides a more reliable protection when torn saw blades fly out.

BRIEF DESCRIPTION OF THE DRAWINGS

The invention will be described further, by way of example, with reference to the accompanying drawings, in which:

FIG. 6 is a side view of a second embodiment of a protection device for a tiltable circular saw machine whose sawing assembly is pivotal in such a manner that the circular saw blade is guided substantially from behind to the workpiece clamping device of the tiltable circular saw machine, the protection device being located in its maximum covering position; and FIG. 7 is a side view of the protection device of FIG. 6 in the finishing position of the saw assembly.

DESCRIPTION OF THE PREFERRED EMBODIMENTS

Figure 1:
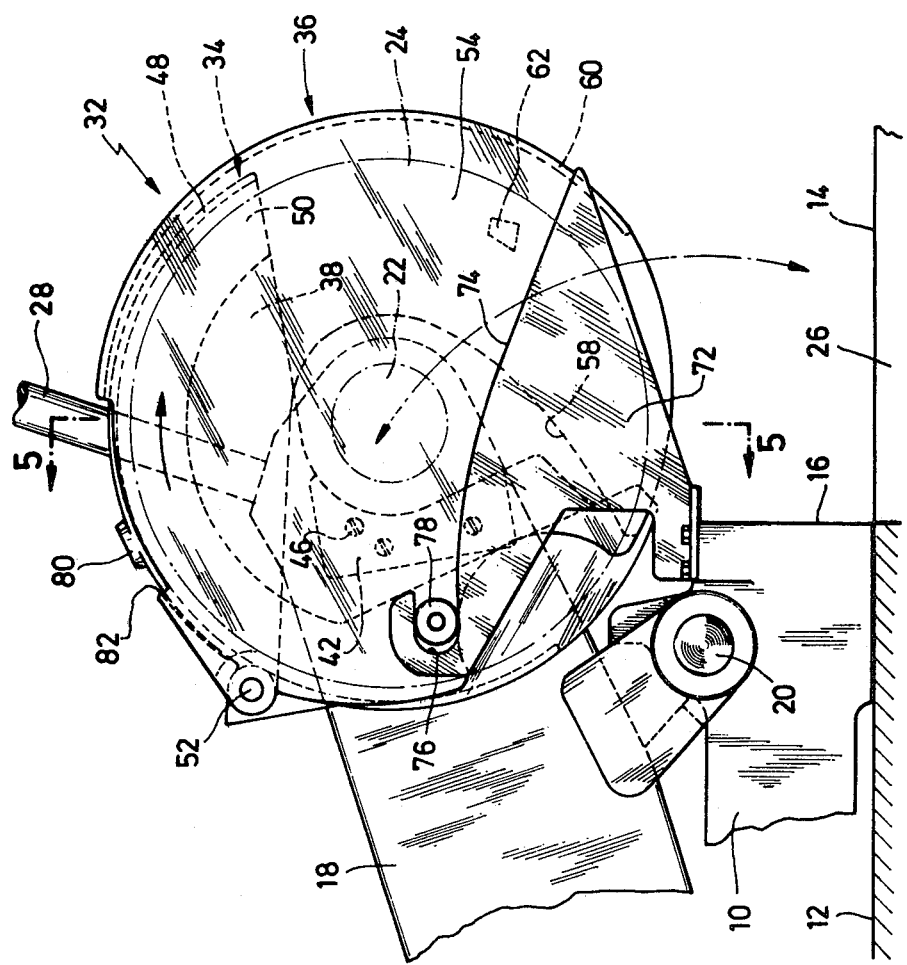
FIG. 1 is a side view of a first embodiment of a protection device in a tiltable circular saw machine whose circular saw blade during its pivotal movement in the direction of the workpiece, is movable along a circular arc portion extending from the top to the bottom, the saw assembly being illustrated in its starting position and the protection device being illustrated in its closed position.

In the construction illustrated in FIGS. 1 to 5 the lower frame portion 10 of a tiltable circular saw machine is located on a base plate 12 which has a workpiece support surface 14. A workpiece abutment face 16 is arranged above the support surface 14 and perpendicular to it. On the frame portion 10 a pivot arm 18 of a saw assembly of the machine is mounted on a horizontal pivot shaft 20 so as to be pivotable between a starting position illustrated in FIG. 1 and a finishing position illustrated in FIG. 3. A saw shaft 22 indicated merely by a dash-dotted line is drivably rotatably mounted at the front end of the pivot arm 18 with its axis parallel to the pivot axis 20, the driving means for the shaft 22 not being shown in detail.

A circular saw blade 24 likewise indicated by a dash-dotted line may be pushed on and fixed on the saw shaft 22. A dip slot 26 is located in the support surface 14 in the plane of the blade 24.

The pivot arm 18 is pivotable between its two end positions by means of a hand lever 28 attached to it, having a spherical knob 30 as a lever grip.

The blade 24 is associated with a protection device 32 which may be attached to the lever arm 18 and which, in the starting position of the blade (FIG. 1), embraces or encapsulates the blade at least in the region of its periphery in such a manner that coming into contact with its saw teeth is impossible.

The protection device 22 comprises a first part 34 and a second part 36. The first part 34 has a side wall 38 with a fixing boss 42 which has a flat abutment face 40 and which is traversed by screw-threaded bores 44. The first part 34 is fixed laterally on the pivot arm 18 by screws 46. The first part 34 also has a peripheral wall 48 which partly embraces the periphery of the blade and the front ends of which have a spacing from one another which, referred to the axis of the saw shaft 22, corresponds to a centre angle $\alpha$ (FIG. 4) of approximately 130°. As may be seen clearly from FIG. 4, the arrangement of the first part 34 on the pivot arm 18 is such that, starting from a peripheral region of the blade located just above the abutment face 16, it extends around the peripheral portion located opposite the operating side and around the upper peripheral portion as far as into the region of the peripheral portion present on the operating side. The side wall 38, adjacent the pivot arm 18, is located in this case at a relatively small radial distance from the saw shaft 22, whereas the side wall 50 adjacent the accessible face of the blade 24 has a relatively small width and a circular arc shape at least in the region of the upper peripheral portion. Thus the first part 34 surrounds the blade 24 over a peripheral region of approximately 230°.

The second part 36 of the protection device 32 forms a cover which is pivotally mounted on a bearing shaft 52 provided on the rear peripheral portion of the first part 34, and which engages over the first portion member 34. The cover comprises, on the side of the freely accessible face of the circular saw blade, a substantially closed side wall 54. The other side wall 56 has a recess 58 which is necessary in order to permit the cover to be swung into its covering position, in which this recess 58 receives the saw shaft 22. The shape of the recess 58, which widens in the peripheral direction, is determined by the radial spacing of the bearing shaft 52 from the saw shaft 22.

A peripheral wall 60 of the cover joins the two side walls 54,56 and, starting from a region in front of the bearing shaft 52, extends so far that, in the maximum covering position of the cover (FIG. 1), the peripheral wall 60 extends into the region of the lower peripheral portion of the blade. In this case the diameter of the cover is greater than that of the blade to such an extent that the saw teeth are located at a radial spacing from the peripheral wall 60, thereby ensuring that in the starting position (FIG. 1) it is impossible to come into contact with them. In this position the cover accommodates the first part 34 practically completely. The position of the bearing shaft 52 is selected in this case in such a manner that the cover moves automatically into its covering position under its own weight as soon as it is unlocked in the release position illustrated in FIG. 4. For this purpose its side wall 56 has an abutment lip 62 which co-operates with an abutment pin 64 on the lever 28. The pin 64 is displaceable from its abutment position illustrated in FIG. 4 within a longitudinal slot 70 to a release position which releases the abutment lip 62, so that the cover swings back automatically to its covering position. The pin 64 is displaced by means of a traction rod 66 which is arranged within the manual lever and which is axially displaceable by radial actuator pins 68.

Figure 4:
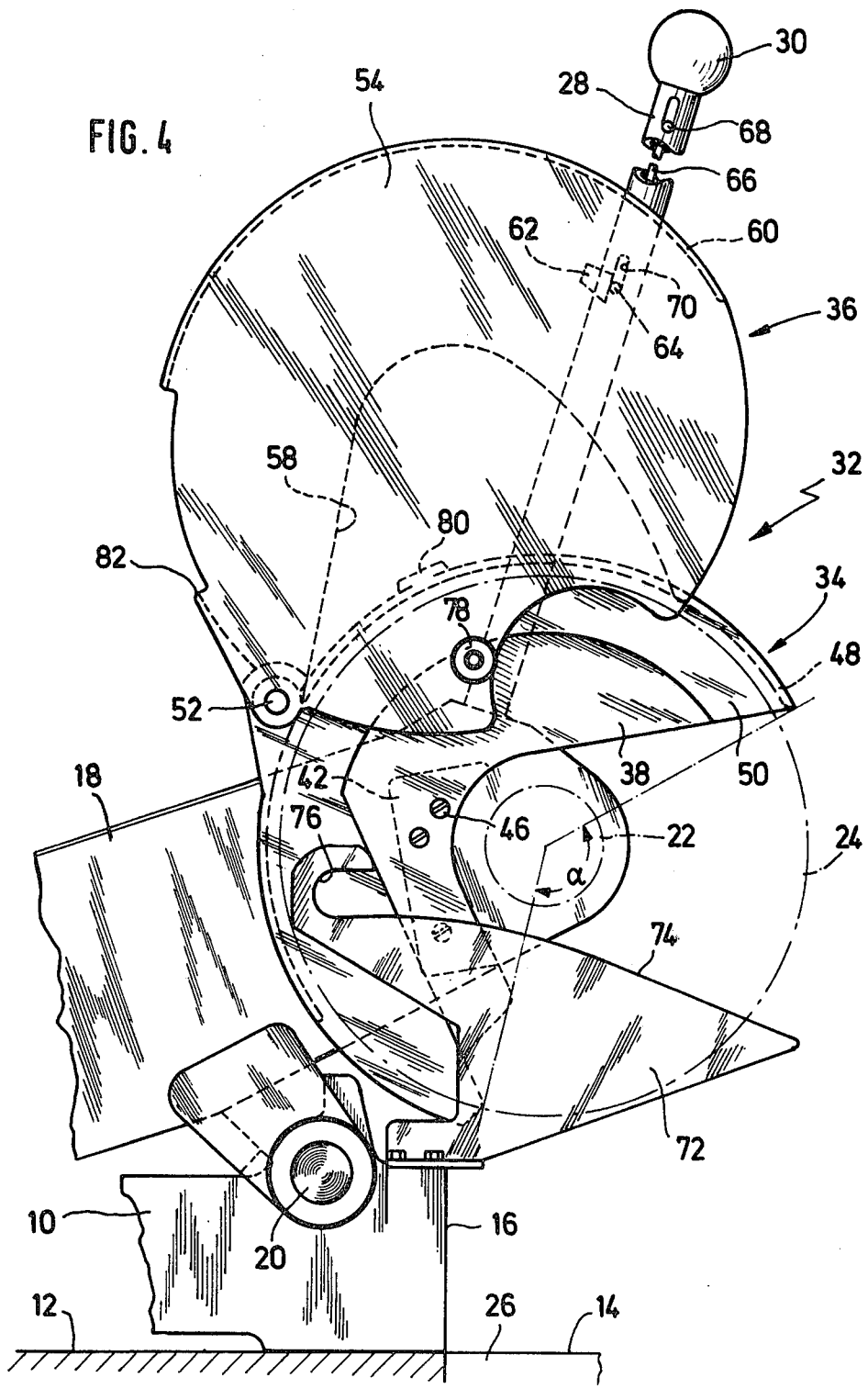
FIG. 4 is a side view of the protection device in the starting position of the saw assembly, the cover of the protection device being swung upwards to its release position.
Figure 5:
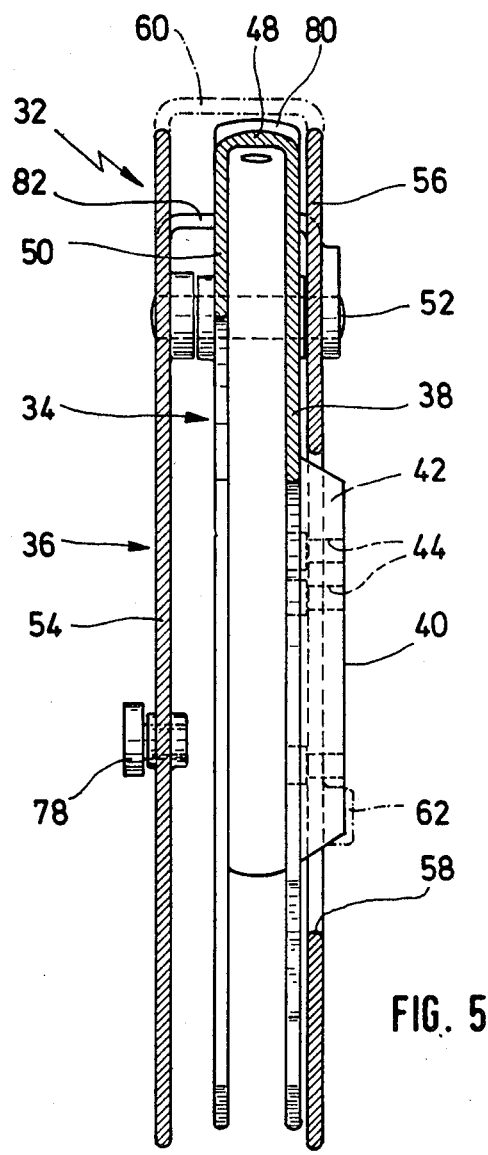
FIG. 5 is a cross-section on the line 5—5 of FIG. 1, on a larger scale than FIG. 1.

For the purpose of changing a blade, the cover may be retained in the release position illustrated in FIG. 4, whereafter the blade can be released from the saw shaft 22 and can be axially displaced within the first part 34 to such an extent that it is free of the saw shaft 22. Thereafter it may be removed from the part 34 and replaced with another one.

Figure 2:
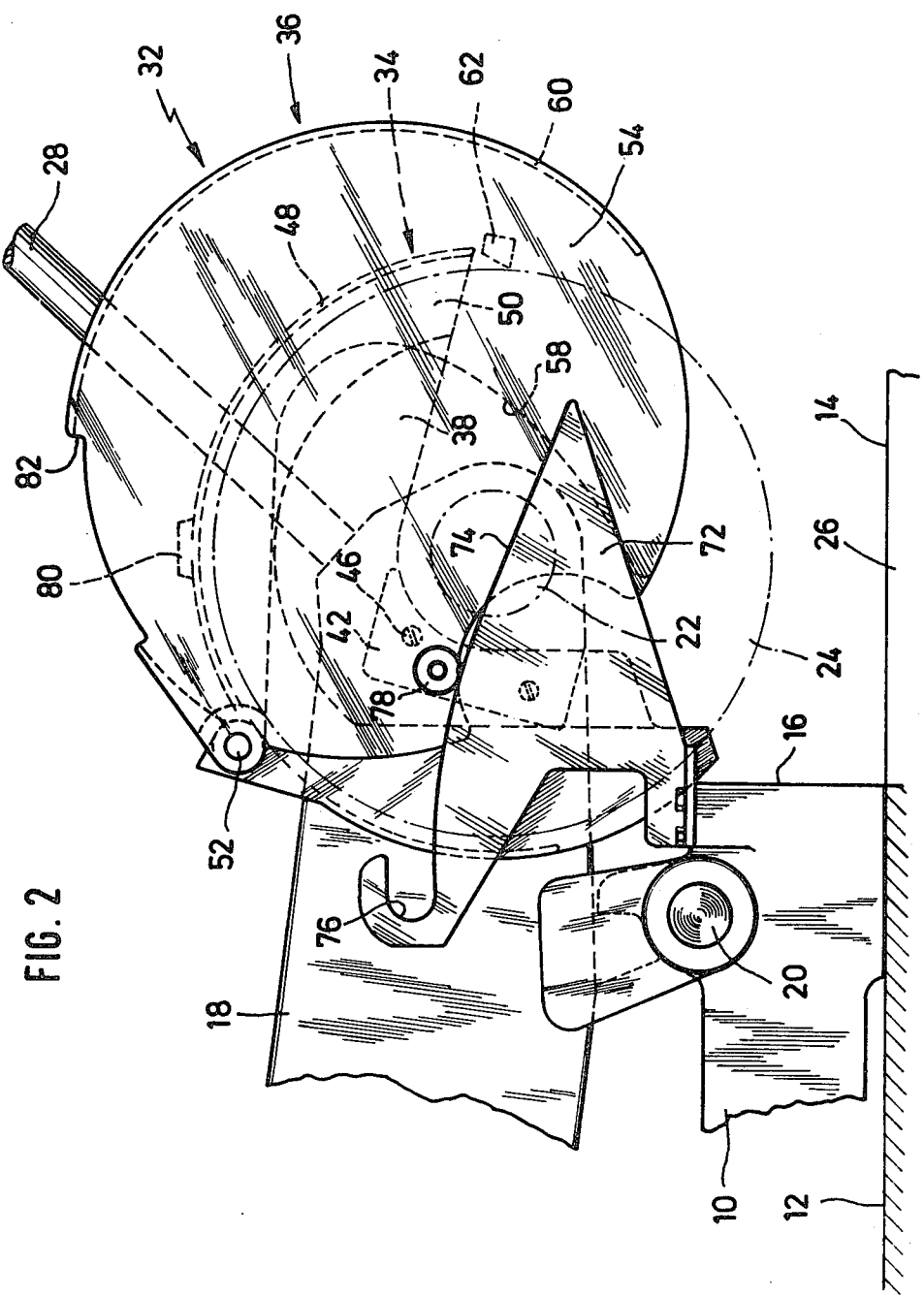
FIG. 2 is a side view of the protection device according to FIG. 1, during a sawing process.
Figure 3:
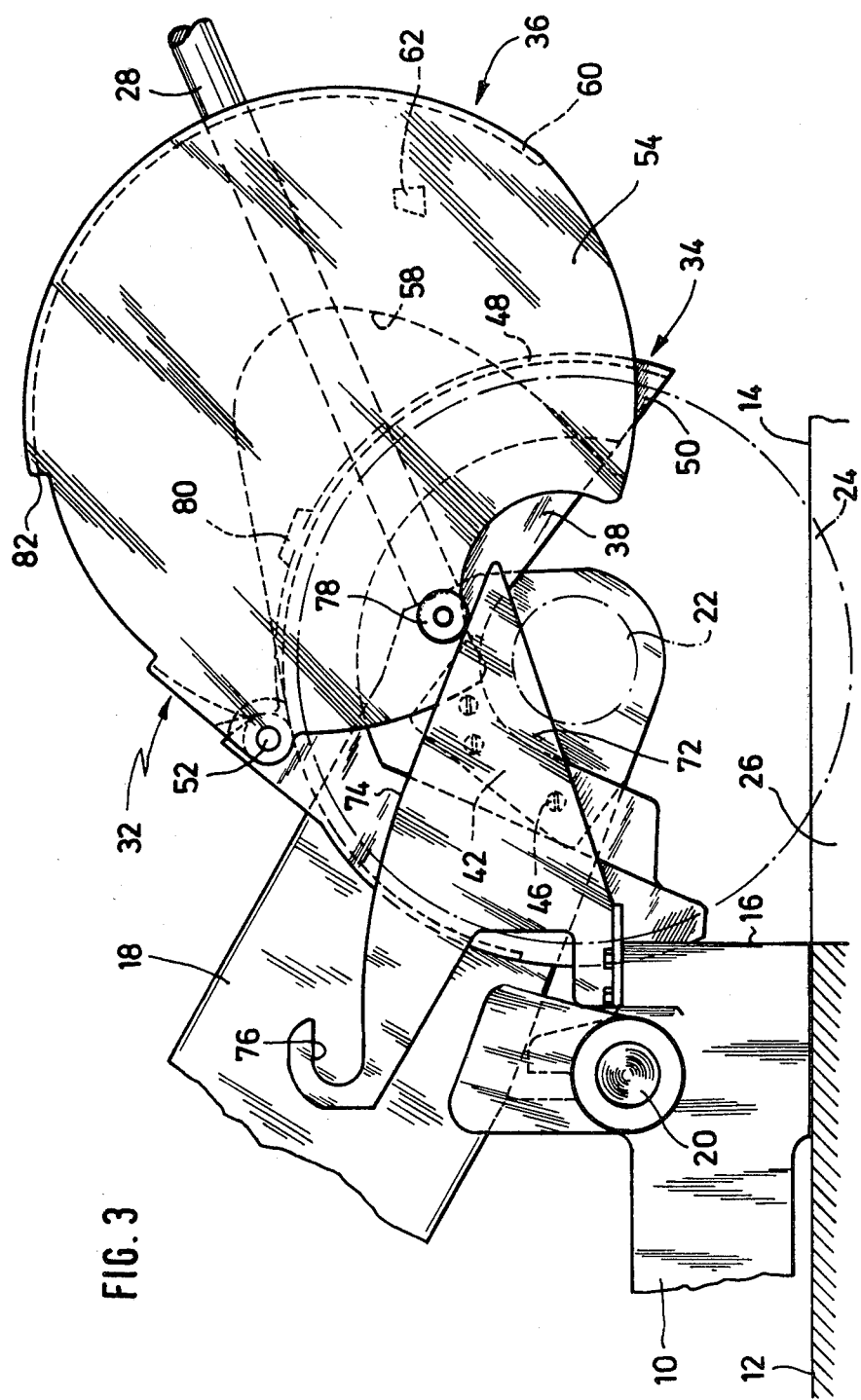
FIG. 3 is a side view of the protection device in the finishing position of the saw assembly.

The part 36 forming the cover is associated with a control device by means of which the cover is pivotally displaced relatively to the first part 34 during the performance of the saw advance in such a manner that in each phase of the advance the cover retains approximately the same position in space, referred to the support surface 14, as will be clear from FIGS. 2 and 3. For this purpose, a cam carrier 72 is provided laterally of the side wall 54 of the cover on the frame portion 10, the cam carrier 72 extending approximately parallel to the side wall 54. Its upper longitudinal edge forms a control cam 74 which terminates in a recess 76 at the rear end of the cam carrier. A cam-following roller 78 is mounted on the side wall 54 and engages in the recess 76 in the maximum covering position of the cover, thereby ensuring that in the starting position of the saw assembly (FIG. 1) the cover is compulsorily locked in its maximum cover position.

Upon tilting of the saw assembly for the purpose of performing the saw advance the roller 78 moves along the cam 74 and thereby causes the movement of the cover relative to the first part 34 of the protection device, as explained above.

The peripheral wall 48 of the first part 34 has a hose connector 80 which in the maximum cover position of the cover (FIG. 1) extends through an elongate recess 82 of the peripheral wall 60 of the cover. By means of a feeder hose (not shown) which may be passed through the peripheral wall 60, cooling liquid and/or lubricating liquid may be fed to this connector 80 and thence to the circular saw blade.

The protection device illustrated in FIGS. 6 and 7, is conceived for a tiltable circular saw whose saw assembly, upon pivotal displacement in the advance direction, is guided to a workpiece clamping device substantially from behind.

In this case merely the hub 86 of the saw assembly is illustrated; it is mounted on a horizontal pivot shaft 84, which is located behind a workpiece clamping device 88.

The saw shaft 90 is indicated by a dash-dotted line, as is a clamped-in workpiece 92. In analogy with the above-described construction, in this construction too, a first part 94 of the protection device 96 is secured to the saw assembly by a fixing boss 98 and fixing screws 100. This first part 94 has substantially the shape of an arc of 90° and extends from the lower peripheral portion of a circular saw blade 102 (illustrated in dash-dotted line) along the rear peripheral portion upwardly, in the starting position of the saw assembly (FIG. 6). At the upper end of the first part 94, a second part 106 of the protection device, which forms a cover, is mounted on a bearing shaft 104 which is secured to the first part; the cover engages over the blade from above and covers it approximately half-way at the periphery and at the side faces. In the starting position of the saw assembly, the cover terminates just above the clamping device 88, whereas the peripheral portion of the blade which faces the operating side is located behind the clamping device. Thereby a sector of the circular saw blade which is present behind the workpiece clamping device and which is preferably smaller than 90° is covered neither at the periphery nor laterally. However, this is not necessary, because in this position of the saw assembly the blade is not accessible from the operating side or from the front end.

In this construction the control means for pivotally displacing the second part 106, forming the cover, relative to the first part 104 operate in a kinematically reversed manner (compared with that described above), in that the longitudinal edge of one side wall 108 of the cover forms a control cam 110, whereas a cam-following roller 112 is mounted on a stationary holder 114. One end of the cam 110 is located within a recess 116 which receives the roller 112 in the starting position of the saw assembly and thereby secures the cover in the covering position.

Inasmuch as the clamping device 88 is pivotally displaceable relatively to the circular saw blade and perpendicularly to the plane of the drawing for the purpose of performing bevel cuts, and is fixable, the holder 114 may form by its shaft member 118 at the same time a pivot axis for the clamping device 88. FIG. 6 indicates by dash-dotted lines various positions of the cover which are assumed relative to the workpiece clamping device during the performance of a saw cut; it is clearly visible that in each phase of the saw advance efficient screening of the circular saw blade is ensured on the operating side. In this case the cam 110 is so designed that at the peripheral end the forward lower edge 120 of the cover is located in a plane which has a smaller spacing from the workpiece support surface of the clamping device than the diameter of the workpiece 92 to be cut through.

I claim:

1. A protection device or a circular saw blade in a circular saw machine having a tiltable saw assembly which comprises a horizontal saw shaft and which is tiltable about a horizontal pivot axis for the purpose of performing the saw advance, the protection device comprising a first part and a second part which, in a starting position of the saw assembly, together cover the circular saw blade from above at its freely accessible side face and at least at a peripheral portion of the saw blade which is present at the operating side of the saw assembly, the first part being arranged stationarily on the saw assembly and the second part being pivotally mounted on a horizontal bearing shaft provided on the first part in spaced relation to said saw shaft and being engageable over the first part, the said first part embracing the circular saw blade at least from behind and extending substantially as far as a lower peripheral region of the saw blade. the said second part forming a cover which in covering position engages over the circular saw blade and which, in the starting position of the saw assembly, surrounds the circular saw blade at an upper peripheral portion thereof and at the peripheral portion of the saw blade which is present at the operating side of the saw assembly at least as far as the vicinity of a lower peripheral portion of the blade which performs the cutting, the device including contol means by which the second part is adjustable about said bearing shaft relative to the first part, during tilting of the saw assembly, in such a manner that, in each phase of the tilting movement of the saw assembly, the second part retains substantially the same position in space relative to a horizontal plane, said control means comprising a control cam interacting with a cam-follower member, said cam having a recess engaging the cam-follower member in the starting position of the saw assembly to prevent said second part from being pivoted from its covering position about said bearing shaft when the saw assembly is in its starting position, the second part also being pivotable about said bearing shaft to a release position permitting replacement of the saw blade when the saw assembly has been tilted from its starting position to a point where the cam-follower member has disengaged said recess, and including means releasably locking the second part in the release position, said bearing shaft being positioned in such a manner, that the second part moves automatically from its release position to its covering position under its own weight as soon as said locking means are released.

2. Protection device as claimed in claim 1, characterized in that the second part (36) is retainable in its release position by means of an abutment member (64) disposed on a lever (28), said abutment member being displaceable from an abutment position to a release position, the second part (36) being released by said abutment member (64) upon displacement of the abutment member to its release position.

* * * * *